United States Patent [19]

Batz et al.

[11] Patent Number: 4,839,642

[45] Date of Patent: Jun. 13, 1989

[54] DATA TRANSMISSION SYSTEM WITH DATA VERIFICATION

[75] Inventors: James E. Batz, Northbrook; Dennis J. Martell, Naperville; Steven A. Overmyer, DeKalb, all of Ill.

[73] Assignee: Northern Illinois Gas Company, Aurora, Ill.

[21] Appl. No.: 106,938

[22] Filed: Oct. 8, 1987

Related U.S. Application Data

[63] Continuation of Ser. No. 693,209, Jan. 22, 1985, abandoned.

[51] Int. Cl.[4] .................. H04Q 1/00

[52] U.S. Cl. .................. 340/825.54; 340/825.06

[58] Field of Search .................. 340/870.02, 825.02, 340/825.03–825.14, 825.54, 825.44, 825.47, 825.48, 310 CP; 370/60, 85, 92, 93, 94, 99, 88; 375/113, 114, 94

[56] References Cited

U.S. PATENT DOCUMENTS

| | | | |
|---|---|---|---|
| 3,001,176 | 9/1961 | Ingham . | |
| 3,121,215 | 2/1964 | Kelar et al. . | |
| 3,319,231 | 5/1967 | Oliver . | |
| 3,670,303 | 6/1972 | Dame . | |
| 3,705,385 | 12/1972 | Batz | 340/870.02 |
| 3,774,114 | 11/1973 | Dahlgren | 340/825.48 X |
| 4,069,477 | 1/1978 | Maben | 340/825.47 |
| 4,161,719 | 7/1979 | Parikh et al. | 375/114 |
| 4,168,400 | 9/1979 | de Couasnon et al. | 370/94 X |
| 4,181,893 | 1/1980 | Ehmke | 340/825.48 |
| 4,320,881 | 3/1982 | Campbell . | |
| 4,369,443 | 1/1983 | Giallanza et al. | 340/825.47 |
| 4,382,256 | 5/1983 | Nagata | 340/825.48 X |
| 4,383,257 | 5/1983 | Giallanza et al. | 340/825.47 |
| 4,398,192 | 8/1983 | Moore et al. | 340/825.44 |
| 4,403,212 | 9/1983 | Masaki | 340/825.48 X |
| 4,410,889 | 10/1983 | Bryant et al. | 375/114 X |
| 4,419,765 | 12/1983 | Wycoff et al. | 340/825.48 X |
| 4,437,095 | 3/1984 | Akahori et al. | 340/825.48 X |

*Primary Examiner*—Ulysses Weldon
*Attorney, Agent, or Firm*—Emrich & Dithmar

[57] ABSTRACT

A system for selectively obtaining information from a plurality of remotely located data indicating devices includes an interrogate source and a plurality of transponders each associated with a different one of the data indicating devices. The interrogate source transmits an interrogate signal for effecting the readout of a selected indicating device, the interrogate signal being a high frequency carrier amplitude modulated with a pair of low frequency signals to represent an eight bit sync code word, a four bit command word and a twenty-eight bit identification code word for addressing a selected transponder. Each transponder includes a receiver which detects the low frequency modulating signals and generates a short duration pulse corresponding to the leading edge of each modulating signal, a processor operating under program control to check on a bit-by-bit basis each bit of the sync code word and of the identification code word as it is received by timing the duration between the receiver generated pulses, and to thereafter compare the first eight bits with a stored sync word and the bits corresponding to the identification word with a stored identification word, the processor responding to the interrogate signal to activate a transmitter to transmit the information provided by the associated indicating device only if the signals detected by the receiver are within a preselected range of frequencies and if a valid sync word and a valid identification word are received.

5 Claims, 5 Drawing Sheets

DIGITAL SECTION 15
R.F. SECTION 14
FUNCTIONAL DEVICE
M1
OPTICAL ENCODER
27
TIMING & CONTROL
26
PROCESSOR
25
INTERFACE
28
T1
VOLTAGE CONTROLLED OSCILLATOR
17
20
TRANSMITTER 17
DETECTOR
29
22
FILTER
21
16
RECEIVER 16
ANTENNA
18
12
13
INT.
M2
MN
T2
TN
10

DATA TRANSMISSION SYSTEM WITH DATA VERIFICATION

BACKGROUND OF THE INVENTION

This is a continuation of application Ser. No. 693,209, filed Jan. 22, 1985, now abandoned.

This invention relates to data transmission systems for effecting remote interrogation of data sources, and more particularly to an arrangement for checking the integrity of transmitted data in data transmission systems.

The concept of remote interrogation of data sources has been applied to many systems for automating the readout of the data provided by such data sources. In one such systems, disclosed in U.S. Pat. No. 3,705,385, which was issued Dec. 5, 1972 and asigned to the assignee of the present application, a two-way radio link is established between a mobile interrogate source, and several data transponders which are associated with utility meters which are to be read. The interrogate source transmits an interrogate signal for actuating the transponder. Each data transponder unit receives the interrogate signal transmitted from the mobile source and the addressed transponder responsively transmits a reply signal which represents the meter reading. The interrogate signal is coded to represent a unique address for each transponder to enable selective readout of the information registered by the associated data sources. Also, the interrogate signal includes a synchronizing signal portion detectable by the transponders as a guard against their responding to spurious noise signals. The reply signal is received by the mobile source and processed to obtain the meter reading.

When a mobile interrogate source is employed, distortion of the interrogate signal may occur in the interrogate signal received by the transponder as the separation between the interrogate source and the transponder changes. This is caused by the multiplicity of propagation paths taken by the interrogate signal as a result of the electrically obscured environment of the transponder location. The interrogate signal is subject to fading, phase shifting, or multipath interference any or all of which would result in fading in the received signal and/or distortion of the received intelligence and inaccuracies in the readout operation. To enhance reliability of remote interrogation operations, it would be desirable to verify that intelligence received by the transponder before activating the transponder to transmit its reply.

SUMMARY OF THE INVENTION

The present invention provides a system for selectively obtaining information from a plurality of remotely located data indicating devices, including an interrogate source and a plurality of transponders each associated with a different one of the data indicating devices, the interrogate source transmitting an interrogate signal for effecting the readout of a selected indicating device, the interrogate signal being encoded with information representing at least a multibit sync word and a multibit identification word for addressing a selected transponder, each of said transponders comprising receiver means, signal processing means and transmitter means, the receiver means receiving the interrogate signal and responsively providing digital signals coded to represent the multibit sync word and the multibit identification word the processing means having means for checking on a bit-by-bit basis each bit of the sync word and of the identification word as it is received, and means for establishing on a word basis, criteria to be met by the bits of the sync word and the identification word, the processing means responding to the interrogate signal to activate the transmitter means to transmit the information provided by the associated data indicating device if the bits and words meet the preselected criteria and the processing means ignoring the interrogation signal if any one of the bits or words fails to meet the preselected criteria.

Thus, in accordance with one aspect of the invention, the incoming interrogate signal is tested on a bit-by-bit basis. In the event an invalid bit is detected, the present interrogate cycle is aborted. The interrogate signal comprises a high frequency carrier amplitude modulated with low frequency signals using a frequency shift key modulation technique wherein a binary 1 is represented by a single cycle at a first frequency and a binary 0 is represented as a single cycle at a second frequency. The transponder circuits check each bit of the interrogate code as it is received, measuring the interval between zero crossings to determine whether the incoming bit is a logic 1, a logic 0, or an invalid bit.

In accordance with a second aspect of the invention, the incoming interrogate signal is checked on a word basis and transponder transmitter activation is effected only after receipt of a valid sync word followed by a valid serial number word corresponding to that assigned to the transponder.

When the number of bits corresponding to the length of the sync word has been accumulated, these bits are compared with a sync word stored by the transponder circuits, and if there is a match, the interrogate cycle continues. After the portion of the interrogate signal corresponding to the transponder serial number has been checked on a bit by bit basis, these bits are compared with a stored serial number assigned to the transponder. If these are a match, the transponder transmitter is activated to transmit its data to the interrogate source.

In accordance with a feature of the invention, the transponder circuit includes timing means which activates the transponder circuits periodically for a short time period and, if an interrogate signal is not being received, returns the transponder circuits to an idle low power for a second, considerably longer time period. The transponder circuits are maintained activated whenever an incoming interrogate signal is detected and during processing of data.

DESCRIPTION OF PREFERRED EMBODIMENT

Figure 1:
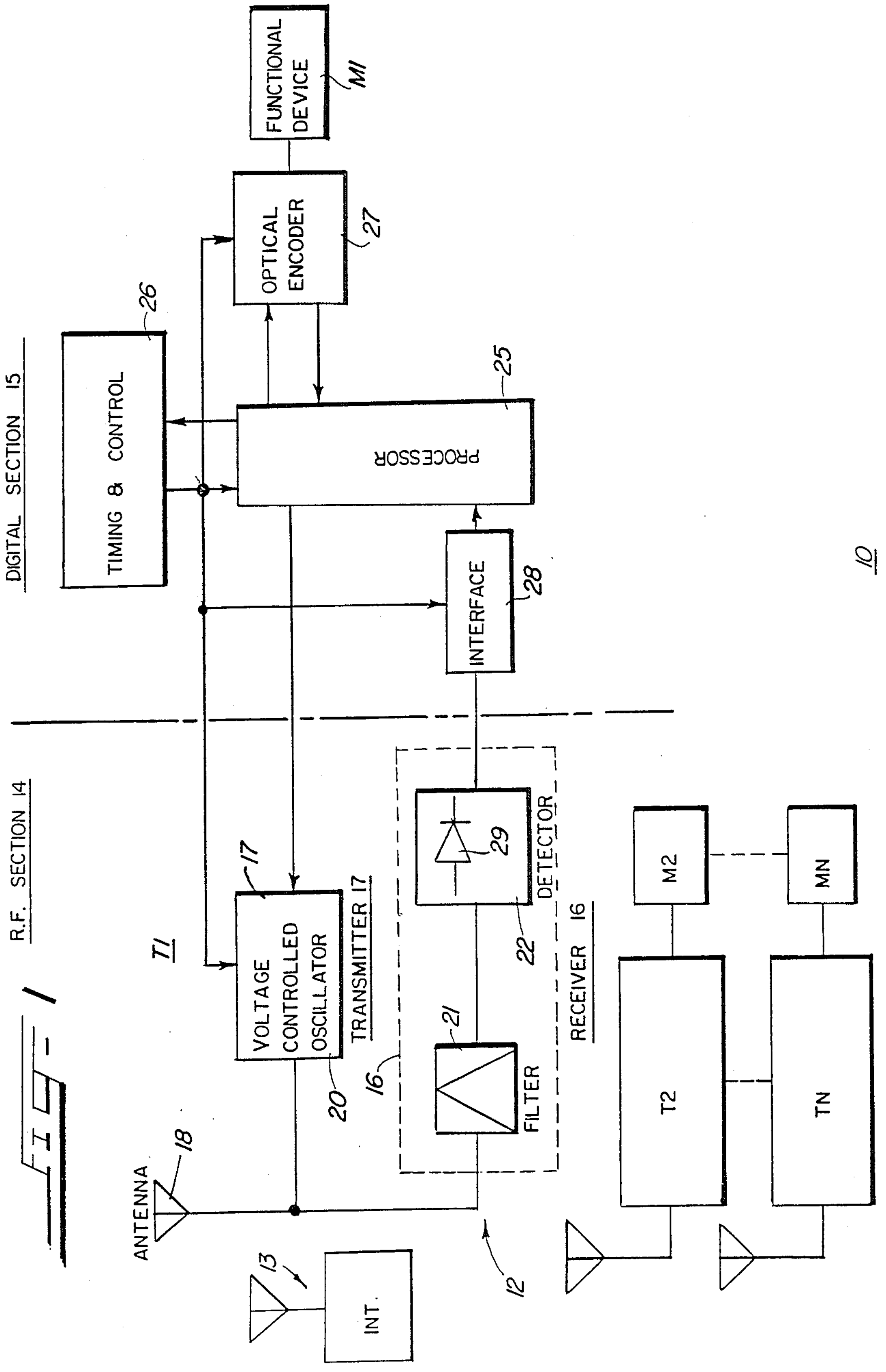
FIG. 1 is a block diagram of a data transmission system including a data integrity checking arrangement provided by the present invention.

Referring to FIG. 1, the data transmission system of the present invention is described with reference to an application for providing automatic readout of data which is provided by a plurality of data sources M1, M2, ... MN, which may be data indicating devices such as registers of utility meters, business machines, etc. A plurality of transponders 12 are provided, each associated with one of the data sources, such as transponder T1 for data source M1.

A radio link is established between the transponders 12 and an interrogate source 13 which may be fixed or located within a mobile vehicle. The interrogate source 13 transmits an interrogate signal to the transponders, and each transponder responds to its unique interrogate signal to generate a reply signal representing, for example, the current reading of the register of its associated functional device and transmit the reply signal back to the interrogate source 13. The interrogate signal is coded to represent a unique serial number or address for each of the transponders to permit selective readout of the information registered by the associated functional device. An example of an interrogate source suitable for use in such system is disclosed in above-referenced U.S. Pat. No. 3,705,385, and accordingly, only the transponder will be described herein.

Each transponder, such as transponder T1, comprises an RF section 14 and a digital section 15. The RF section 14 has a receiver 16 and a transmitter 17 both which are diplexed to an antenna 18. The transmitter 17 includes a voltage controlled oscillator 20. The receiver 16 includes a bandpass filter 21 and a detector 22. The digital section 15 includes a processor 25, a timing and control circuit 26, an encoder 27, and receiver interface circuit 28.

In the transponder receiver 16, the bandpass filter 21 has its input connected to the antenna 18 and its output connected to the detector 22 which may comprise a crystal video diode 29, such as the type IN82G. The detector 22 is followed by the receiver interface circuit 28.

The bandpass filter 21 defines the response frequency band for the receiver 16 which is centered at 451 MHz. The voltage controlled oscillator 20 of the transmitter has a center frequency of 414 MHz and this signal is spread spectrum modulated with a binary encoded FSK signal representative of the data to be transmitted to the interrogate source 13. An example of use of spread spectrum modulation in a wireless data transmission system is disclosed in the U.S. Pat. No. 3,967,202 of James E. Batz.

Each transponder is assigned a seven digit serial number or address which allows it to be uniquely addressed by the interrogate source 13. The interrogate signal consists of an eight bit sync word, a four bit command word, indicating what information is requested, and a twenty-eight bit serial number or word, representing a seven digit serial number for the transponder selected for readout. The interrogate source generates an interrogate signal by amplitude modulating the 451 MHz transmitter carrier with a digital code signal. The digital information is encoded by varying the duration of 50% duty cycle pulses of a single cycle of 2.77 kHz, or 1.786 kHz representing a logic 0 or a logic 1, respectively. Thus, a binary 1 is represented as a cycle of 560 microseconds duration while a binary 0 is a cycle of 360 microseconds duration.

The receiver 16 detects the incoming amplitude modulated signal, recovering the low frequency digital information and the interface circuit 28 generates short duration pulses which serve as interrupts to the processor 25. The period between the pulses corresponds to the period of the incoming data.

The processor 25 pocesses the incoming digital information under software control, providing bit and word verification operations, reformulates the sync word, command word and serial number word of the interrogate signal, and generates control commands for enabling the transmitter 17 to transmit data when receipt of a valid address is verified.

The processor 25 also monitors the encoder 27 associated with the register of the functional device M1 to receive and store data indicative of the reading of the register prior to transmission of the data to the interrogate source 13. The timing and control 26 provides a time base for the transponder circuits and defines a low power-idle mode in which the processor 25 is activated for approximately 1% of the time. The timing and control 26 controls reset operations for the processor 25.

More specifically, the timing and control 26 activates the system clock, resetting the processor 25 and enabling it to respond to the interrupts. The processor 25 times the interval between successive interrupts to determine if the incoming bit is a logic 1, a logic 0 or an invalid bit. Any detection of an invalid bit results in the termination of any further processing of the current interrogate cycle. After eight valid bits have been received, the "received" sync word is checked with a stored sync word and if comparison is indicated, the interrogate cycle continues. When the twenty-eight bit code for the serial number has been received, the serial number word is checked with a stored word.

When a valid interrogate signal is received and the received serial number code corresponds to that assigned to the transponder, the processor 25 controls the transmitter 17 in transmitting the data as requested, as indicated by the command word, either the reading of the register associated with the data source M1, or the serial number of the transponder.

The transmitter 17 replies with a 414 MHz carrier spread spectrum modulated with a binary encoded FSK signal. Modulation frequencies of 45.45 kHz and 50.00 kHz are used to represent binary values of "0" and "1", respectively, with each bit having a 360 microsecond duration.

The timing and control 26 provides a power conserving feature. Normally, the timing contrql 26 maintains the transponder circuits in a low power mode by disabling the processor clock. Approximately once every second, the timing and control 26 allows the processor 25 to operate. During this time, the processor 25 updates the reading, then enables the receiver 16 to "listen" for an interrogate signal. When no interrogate signal is present, the timing and control 26 disables the clock, typically within 30 milliseconds. The transponder circuits are placed in a low power mode for another second, and the cycle repeats. If an interrogate signal is detected while the processor 25 is running, the processor 25 overrides the timing and control 26. The processor 25 is programmed to stay active as long as a valid interrogate signal is being received. The low power mode as well as low power consumption characteristics of the processor 25 and other transponder circuit devices enables the transponder circuits to be battery powered.

In the normal mode of operation, the transponder circuits become active approximately once each second, update the reading if necessary. If an interrogate signal is not being received, the unit returns to its low power mode for another second. An interrogation signal is recognized by the 360/560 microsecond period of the received data and the periodic reception of a sync word. When an interrogation signal is received, the processor 25 checks to see if the serial number in the interrogation signal can be matched to its own. If they match, the commond word is checked to see what information is requested, i.e. the serial number or the reading. The transponder then responds by transmitting the appropriate information.

TRANSPONDER DIGITAL CIRCUITS

Figure 2:
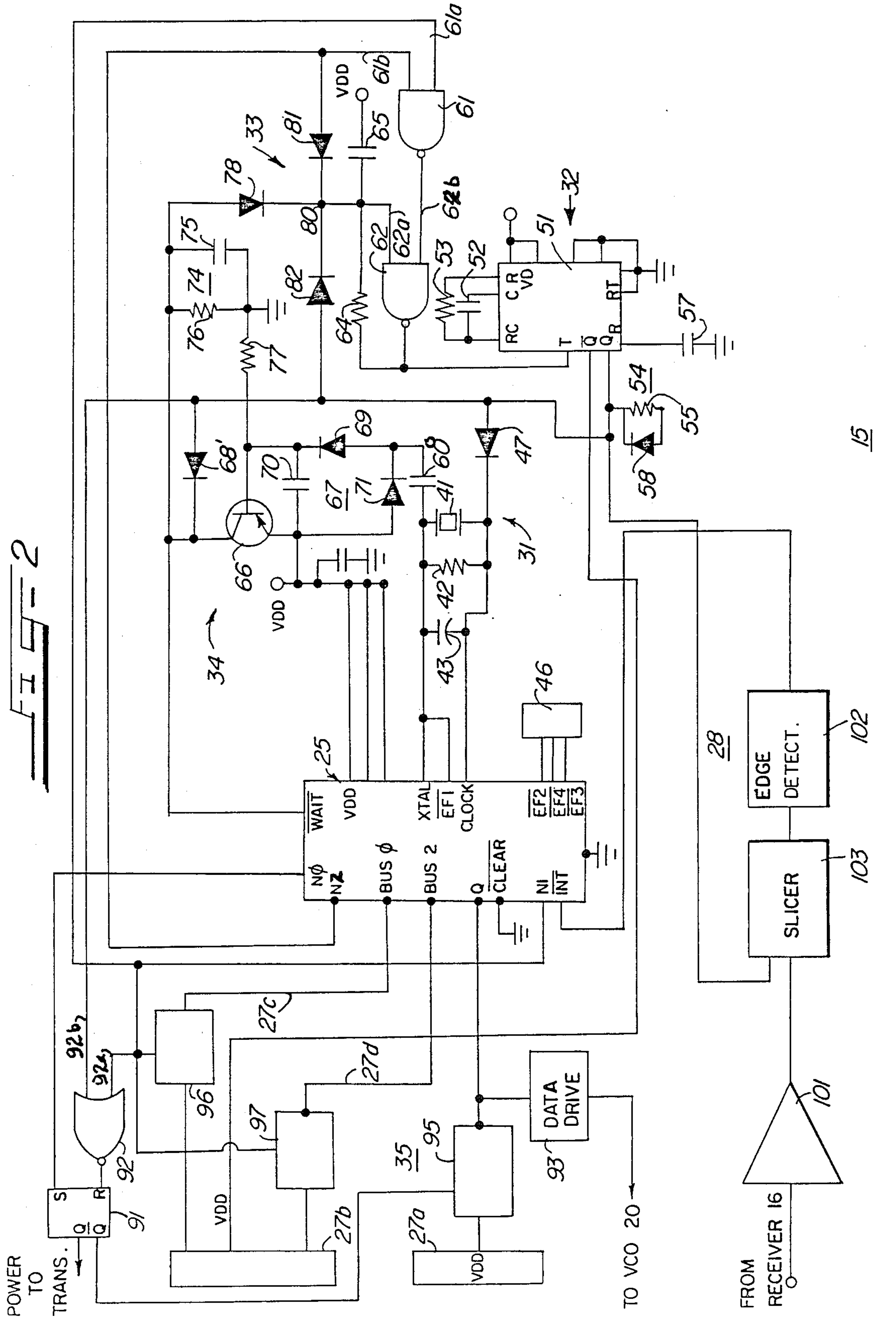
FIG. 2 is a schematic circuit diagram of the digital section of a transponder of the system of FIG. 1.

Considering the digital section 15 of the transponder in more detail, with reference to FIG. 2, the processor 25 is commercially available as the RCA type signal CPD1804A single chip microcomputer, an 8-bit CMOS processor which provides 2 kilobytes of ROM permanent program storage, 64 bytes of RAM and an internal programmable timer/counter and internal 16×16 bit register array used for program counters, data counters and data registers. The microcomputer has three input-/output control lines NØ–N2, four software testable input event flag lines EF1–EF4, and a single bit output line Q which can be set and reset under software control or by the timer-counter. One external interrupt line INT is also provided. The microcomputer also has eight data inputs of which BUS Ø and BUS 2 are used, external clock timing inputs XTAL and CLOCK, and two control inputs $\overline{\text{WAIT}}$ and CLEAR.

The optical encoder 27 includes a light source 27*a* and a detecting circuit 27*b* and is used to detect the position of an interruptor disc (not shown) attached to an indexing mechanism of the data source register. The disc is configured to shade the detecting circuit 27*b* from light from the light source 27*a* as the disc turns. The detecting circuit 27b provides outputs over a pair of output lines 27c and 27d indicative of an unambiguous indication of the completion of a revolution of the disc. The processor 25 monitors these output lines 27*c* and 27*d* and registers a cummulative count corresponding to the number of revolutions of the disc, thus providing information indicative of the reading of the data source register. An example of an encoder suitable for this application is disclosed in U.S. patent application Ser. No. 596,236, of Dennis J. Martell, which was filed on Apr. 2, 1984 and is assigned to the assignee of this application.

The timing and control 26 includes a crystal clock oscillator 31, a timer circuit 32, a timeout delay network 33, a timeout override circuit 34, and a transmitter/encoder enable circuit 35.

The crystal clock oscillator 31 includes a 2 MHz crystal 41, a resistor 42 and capacitor 43 connected in parallel with the crystal 41. The 2 MHz crystal 41 is connected to the on-chip oscillator terminals XTAL and CLOCK to provide a clock source which sets the machine cycle at 4 microseconds. The clock signal is also fed to one of the event flag lines $\overline{\text{EF1}}$ to provide a source for the counter/timer circuit. The other event flag lines $\overline{\text{EF2}}$ to $\overline{\text{EF4}}$ are connected to a programmer network 46 to set their logic levels to define different operating modes for the processor 25. In the present embodiment, the processor 25 is set to operate under software control to transmit either its data or its serial number in accordance with the command word information transmitted in the interrogate signal.

The timer circuit 32 includes a multivibrator 51 configured in a monostable mode with a pulse period of approximately one second which is determined by an external timing network, formed by capacitor 52 and resistor 53, which is connected to the timing inputs R, C, and RC of the multivibrator 51. When the multivibrator 51 is triggered by a pulse applied to its trigger input T, the true output Q of the multivibrator 51 goes high. When the multivibrator 51 times out, its false output $\overline{\text{Q1}}$ goes high.

The true output Q of the multivibrator 51 is connected through diode 68' to input WAIT of the processor 25 and through diode 47 and resistor 42 to the CLOCK input of the processor. The true output Q of multivibrator 51 is also connected to an inhibit input of amplifier circuit 103.

A reset network 54 formed by resistor 55, capacitor 57 and diode 58 is connected between the true output Q of the multivibrator 51 and its reset input R. The reset network 54 allows the level at R to reach the logic 1 condition to reset the multivibrator 51 if the pulse on output Q is appreciably longer than one second, indicating a latchup condition. The false output $\overline{\text{Q}}$ of the multivibrator 51 is connected to the power input of the encoder detector circuit 27*b*.

The timeout delay network 33 includes tandem connected NAND gates 61 and 62 and a timing network formed by resistor 64 and capacitor 65. The timeout override circuit 34 includes an NPN transistor 66, having an input network 67 including a capacitor 68 and a diode 69 which are connected between the output of the crystal oscillator 31 and the base of transistor 66, and a capacitor 70, which is connected between emitter and base of transistor 66. A diode 71 is connected between the emitter of transistor 66 and the junction of capacitor 68 and diode 69.

The timeout override circuit 34 further includes an output network 74 including capacitor 75 and resistor 76 which are connected in parallel between the collector of transistor 66 and ground. A resistor 77 is connected between the base of transistor 66 and ground. The collector of transistor 66 is connected to the input $\overline{\text{WAIT}}$ of the microcomputer and through a diode 78 to the junction of resistor 64 and capacitor 65 at point 80 to which is connected one input 62*a* of NAND gate 62 which has its other input 62*b* connected to the output of NAND gate 61. NAND gate 61 has its inputs connected to respective outputs N1 and N2 of the processor 25. Processor output N2 is also connected through diode 81 to point 80. In addition, the true output Q of multivibrator 51 is connected through diode 82 to point 80.

The transmitter/encoder enabling circuits 35 include a latch circuit 91 having a set input connected to the output N0 of the processor 25, and a reset input connected to the output of a reset gate 92, embodied as a two-input NOR gate, which has its inputs 92*a* and 92*b* connected to processor output N1 and multivibrator output Q, respectively. A data drive circuit 92 has its input connected to the processor data output Q and its output connected to the drive input of the voltage controlled oscillator 20 (FIG. 1).

Control of the operation and readout of the encoder 27 is effected through transmission gates 95, 96 and 97. Transmission gate 95 has its input connected to the data output Q of the processor, its output connected to the power supply input of light source 27*a* of the encoder 27, and its enabling input connected to the false output of latch circuit 91. Transmission gates 96 and 97 are connected between respective encoder output lines 27*c* and 27*d* and respective data inputs BUS Ø and BUS 2 of processor 25. The enabling inputs for transmission gates 96 and 97 are commonly connected to processor output N1. In addition, the power input to the detecting circuit 27*b* is connected to output $\overline{Q}$ of the multivibrator 51.

Referring now to the receiver interface circuit 28, this circuit includes a high gain linear amplifier stage 101, an edge detecting circuit 102, and a slicing circuit 103 which is interposed between the amplifier stage 101 and the edge detecting circuit 102. The elements of the interface circuit 28 are well-known in the art and accordingly are shown in block diagram form in FIG. 2. The amplifier stage 101 amplifies the AC signal output of the detector 22 which is the 2.77 kHz or 1.786 kHz digital code signal.

The slicing circuit 103 limits this signal, providing a square wave signal 560 microseconds in duration for each logic 1 bit and 360 microseconds for each logic 0 bit of the interrogate code. The slicing circuit 103 has an input connected to the true output Q of the multivibrator so that the slicing circuit 103 and the edge detecting circuit 102 are inhibited when the receiver circuits are in the low-power mode.

The edge detecting circuit 102 responds to the output of the slicing circuit 103 to provide interrupt pulses to the processor 25 by converting the rising edges of pulses in the data stream into short pulses of 30 to 40 microseconds duration. The processor 25 measures the period between these pulses to determine the length of the incoming data bits.

OPERATION OF THE TRANSPONDER DIGITAL CIRCUITS

As an aid in understanding, it will be beneficial to describe the operation of the hardware circuits of the receiver before describing the system operation and the software which controls the processor 25.

Referring to FIG. 2, the timing and control 26 normally maintains the transponder circuits in the low power mode but activates them for about 30 milliseconds once every second. As indicated, the multivibrator 51 is configured in a monostable mode, with a pulse period of approximately one second set by capacitor 52 and resistor 53. When the multivibrator 51 is triggered, its true output Q is high and its false output $\overline{Q}$ is low. This keeps the transponder circuits in the low power mode. With output $\overline{Q}$ low, this turns off the power to the detecting circuit 27*b*. With the Q output high, the crystal clock oscillator 31 is kept from running by diode 47 which pulls the processor CLOCK input high. Stopping the processor clock reduces its power consumption significantly. The $\overline{\text{WAIT}}$ line of the processor 25 is also held high thru diode 68' by the high level on the multivibrator true output. With the processor $\overline{\text{WAIT}}$ line high and its $\overline{\text{CLEAR}}$ line low, the processor 25 is held in a reset state. The high level on the multivibrator Q output also keeps slicing circuit 103 and the edge detecting circuit 102 in a inactive state.

When the multiibrator 51 times out, its Q output goes low and its $\overline{Q}$ output goes high. This enables the slicing circuit 103 and the edge detecting circuit 102 of the receiver circuitry and supplies power to the detecting circuit 27*b*. The high evel clamps on the CLOCK and $\overline{\text{WAIT}}$ inputs of the processor 25 through respective diodes 68' and 47 are released. This allows the crystal clock oscillator circuit 31 to begin to run. Also released is the high level clamp through diode 82 to input 62*a* of gate 62. Transistor 66 continues to hold the $\overline{\text{WAIT}}$ line of the processor 25 high until the crystal 41 has begun to oscillate and the output of the crystal oscillator circuit 31 has begun to stabilize. The oscillator signal turns off transistor 66 by pulling its base high through capacitor 68, and diode 69. When the $\overline{\text{WAIT}}$ output goes low, the processor 25 is placed in the run mode.

When input 62*a* of gate 62 is unclamped due to timeout of multivibrator 51, it initially remains high due to the high signal supplied by transistor 66 through diode 78 when the transistor 66 is conducting. When transistor 66 turns off and the processor 25 begins to run, input 62*a* of gate 62 is held high by the charged state of capacitor 65. Capacitor 65 begins to discharge, and if undisturbed, the voltage on the capacitor 65 reaches the switching threshold of gate 62 in about 10 milliseconds. Note that the other input of gate 62 is held high by gate 61. When the threshold is reached, gate 62 generates a trigger pulse that starts the multivibrator 51, placing the transponder circuit back into a low power mode.

The processor 25 can delay the entrance into the low power mode by generating pulses on its output N2. These pulses charge capacitor 65, increasing the voltage level on the timing capacitor 65. By repeatedly pulsing this output, the processor 25 can override timing and control 26 to keep the transponder circuits active as long as required to complete the processing of data during an interrogate cycle. The processor 25 also has the ability to immediately place the transponder circuits in the low power mode by simultaneously pulsing its N2 and N1 lines. This generates the trigger pulse thru gate 62 required to start the multivibrator 51. The multivibrator 51 has a fail-safe feature using the timing network comprised of resistor 55 and capacitor 57. If the output pulse of the multivibrator 51 significantly exceeds its one second duration, the multivibrator 51 is reset by a high level provided at its RESET input by the timing network.

To read the encoder 27, the processor 25 sets its output Q high. Transmission gate 95 is normally maintained conducting when the transponder is not transmitting so that the signal on output Q is extended through transmission gate 95 to enable the light source 27*a*.

To read the status of the detector 27*b*, the processor 25 pulses its output N1 which enables transmission gates 96 and 97, connecting the outputs of the encoder at lines 27*c* and 27*d* to inputs BUS Ø and BUS 2 of the processor 25. The processor 25 reads these inputs, processes the information provided and when appropriate, updates the count register which stores the reading provided by the associated functional device.

To transmit a reply, the processor 25 turns on the transmitter 17 by setting latch circuit 91 and supplies the modulation signal to the data drive circuit 93 via output Q. The setting of latch circuit 91 causes application of power to the transmitter oscillator 20.

Modulation representing the information to be transmitted is generated by the processor 25 and appears at its Q output line in the form of a 45 kHz/50 kHz FSK square wave signal. When the transmitter 17 is enabled, transmission gate 95 is disabled by latch circuit 91 and keeps the modulation on the processor's Q line from turning on the encoder light source 27*a*. In order to turn off the transmitter, the processor 25 pulses its N1 line, which resets latch circuit 91 via gate 92.

TRANSPONDER SOFTWARE CONTROL

The processor 25 operates under program control to receive and process the incoming interrogate signal and verify the incoming interrogation code as it is received, to read the status of the encoder outputs and accumulate data representative of the reading, and to verify receipt of the address of the transponder and to control the transmitter in sending the stored data back to the interrogate source 13.

Figure 3:
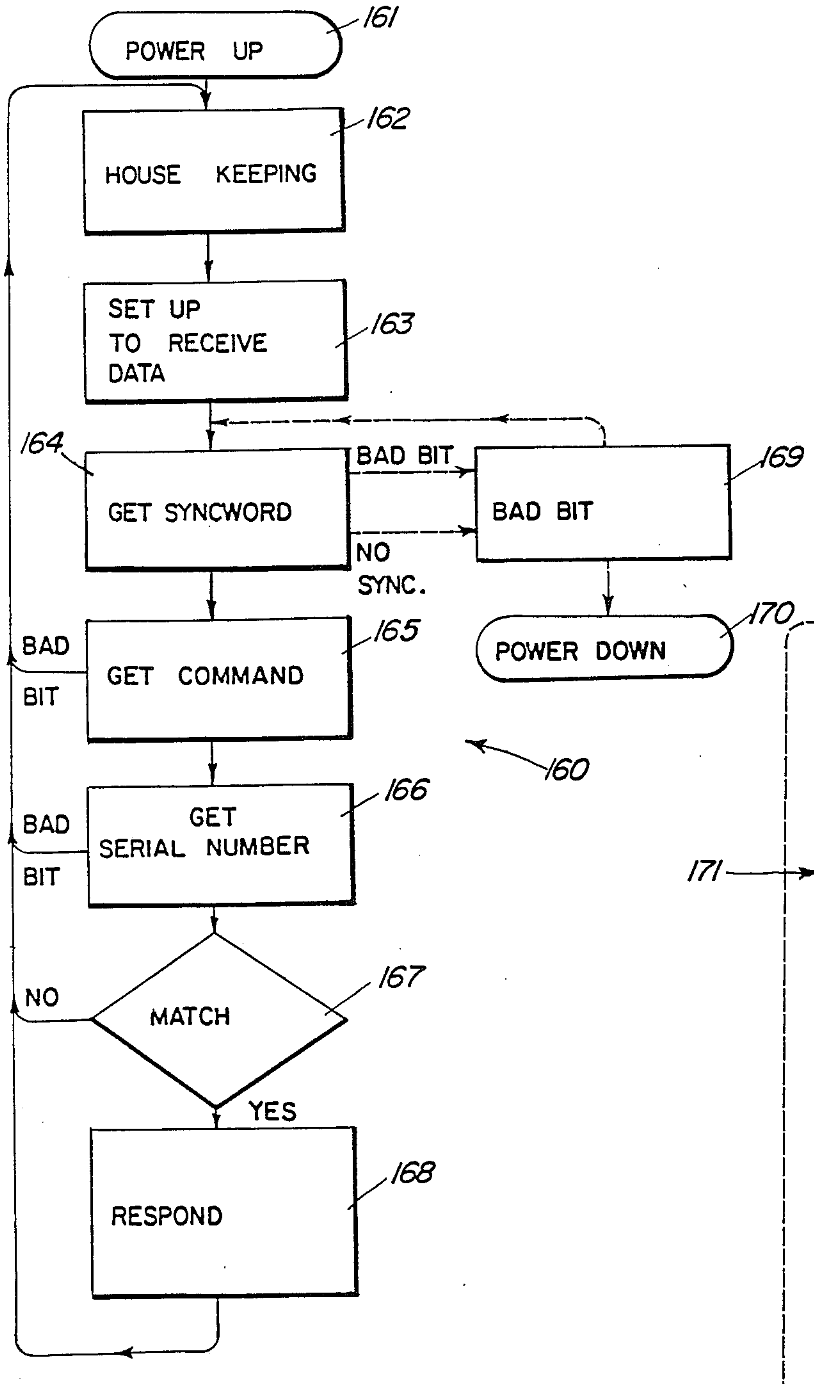
FIG. 3 is a flow chart illustrating the operation of the receiver during processing of data.
Figure 4:
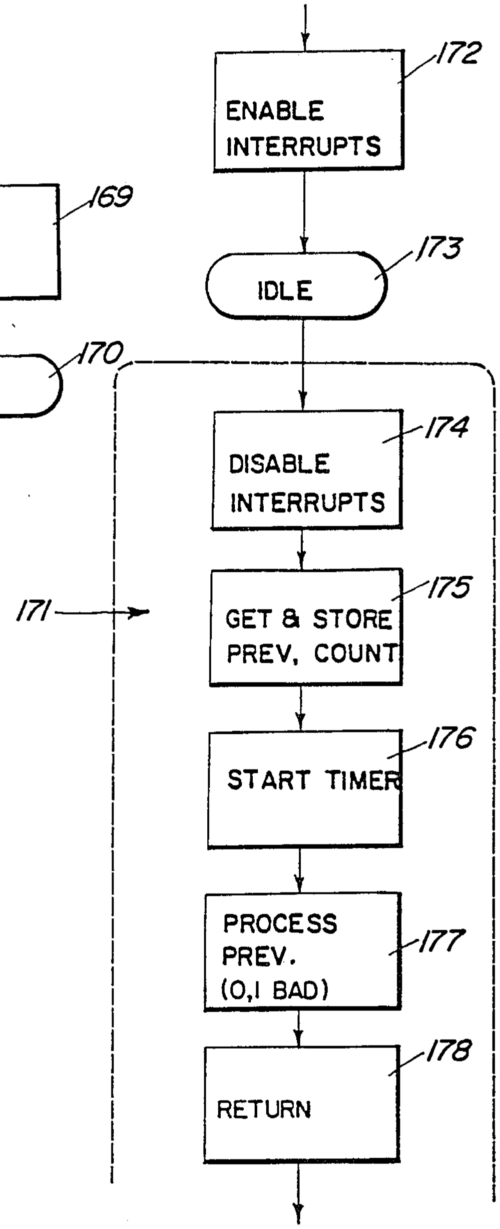
FIG. 4 is a flow chart illustrating the operation of the receiver during a subroutine for processing incoming data.
Figure 5:
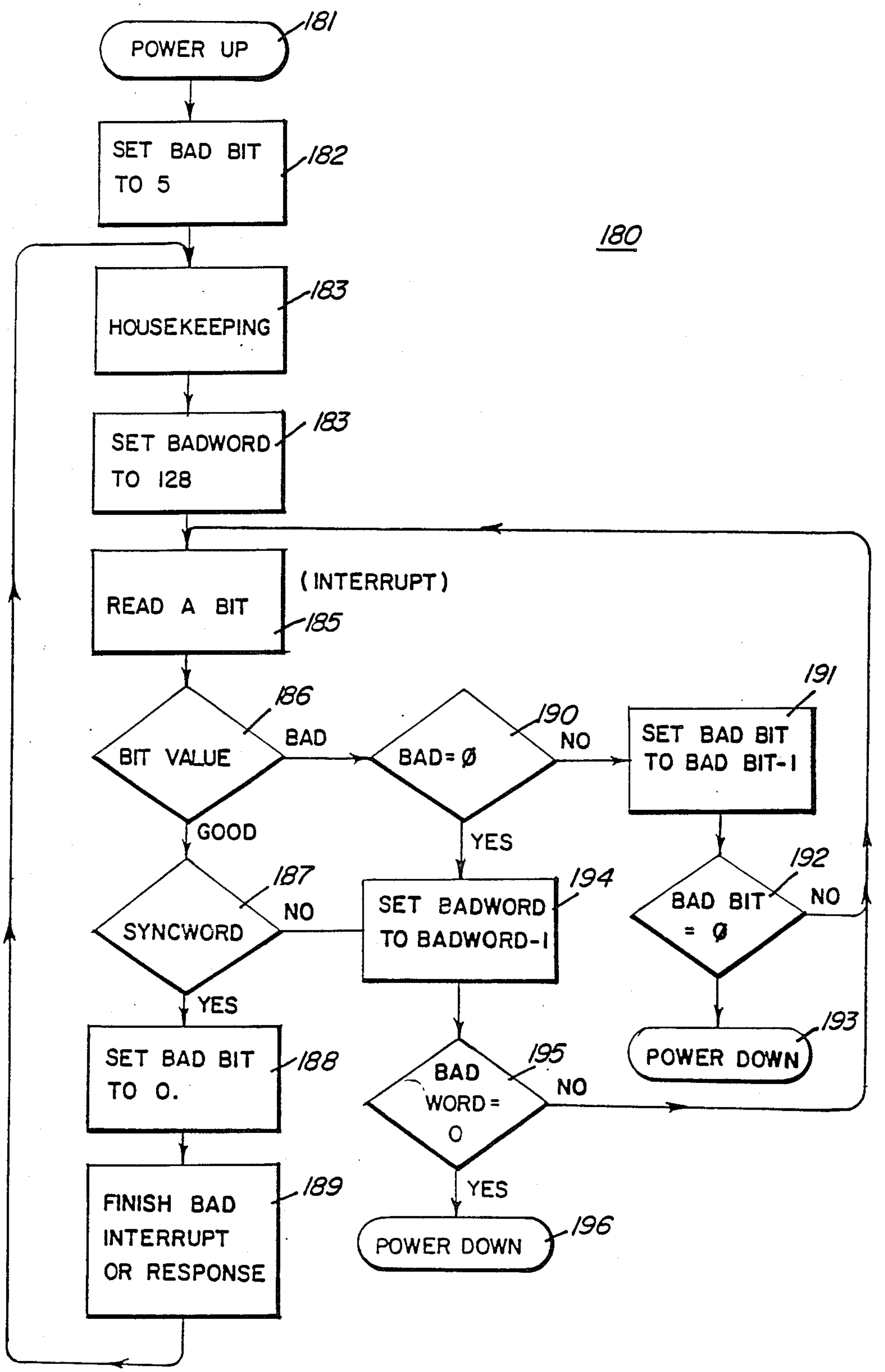
FIG. 5 is a flow chart illustrating the operation of the receiver during checking and verifying incoming data bits and data words.

The program consists of a main routine the flow chart for which is shown in FIG. 3, an interrupt routine the flow chart for which is shown in FIG. 4, and a data bit verification routine the program flow chart for which is shown in FIG. 5. A program listing is provided in Appendix I.

The main routine controls the initialization of the processor circuits, setting up the processor 25 to receive data. The main routine also controls forming of the sync word, the command word, and the serial number, as the bits are received, matching of the serial number and enabling the transmitter when a match is detected. The interrupt routine handles receipt of the input bits from the edge detecting circuit and the storing of each valid bit as it is received. The verification routine verifies valid bits and valid data words and terminates interrogate operation whenever a selected member of invalid bits or words is detected. In the exemplary embodiment, the interrogate cycle is terminated whenever five bad bits are detected or if 128 valid bits are detected before a valid sync word has been received.

More specifically, referring to FIG. 3, the main receiver routine 160 provides at block 161 for activation of the processor 25 in response to the timing and control 26. The processor performs housekeeping activities block 162, such as reading external status lines, and at block 163, sets up to receive data. The receiver main program also forms the multi-bit interrogate word, blocks 164–166, including the eight bit sync word, the four bit command and the twenty-eight bit serial number for the incoming data, and performs the internal address match at block 167, activating the system at block 168, to respond when the proper serial number is verified and to activate the transmitter 17. During processing of the sync word, if a bad bit is detected or if less than eight bits have been received, the system enters the bad bit routine at block 169, shown in detail in FIG. 5 and deactivates the system at block 170 if five bad bits or 128 good bits have been received before a sync word has been received. Then in the event an error is detected during processing of the command word at block 165 or the serial number at block 166, the system returns and the routine is reinitiated. Likewise, if a valid serial number match is not detected, the system returns and reinitiates the routine. The power down operation effected at block 170 results in the processor 25 halting operation and awaiting timeout by timing and control 26.

Referring now to FIG. 4, the interrupt routine 171 is entered each time data is provided over the interrupt line. Once the main program has completed housekeeping operations and is set up to receive data, interrupts are enabled at block 172 and the system reverts to an idle mode at block 173 awaiting an interrupt. When an interrupt is detected, the system at block 174 disables further interrupts temporarily while processing operations are effected. At block 175, the previous count, representative of the frequency of the incoming signal if this is the second interrupt, is stored and the interval timer is started at block 176 to time the duration between the present interrupt and the next interrupt. At block 177, the bit value is determined by checking the stored count which represents the time between successive interrupts, to determine if the bit received is a logic 0, a logic 1 or a bad bit. This bit value information is determined by the verification routine at block 186 (FIG. 5).

Referring to FIG. 5, the verification routine is illustrated as flow chart 180. This routine is entered from the main receiver program and involves initiating the bad bit counter at block 182 and the bad word counter at block 184. Block 185 is the interrupt routine illustrated in FIG. 4 which receives and processes the incoming information. In blocks 186–189, the verification routine determines if a good bit has been received, and if the expected sync word has been received, and if so, the bad bit counter is set to "0". The main system routine is entered at block 189 (blocks 165–167 in FIG. 3), where the routine is completed.

Blocks 190-193 detect receipt of a bad bit, including checking to see how many bad bits have been received, decrementing the bad bit counter and initiating a power down operation when the bad bit counter is decremented to zero. Blocks 194–196 provide a corresponding operation for checking the number of bits which have been received and effecting power down when the number of good bits exceeds the count of 128 before a sync word is detected.

SYSTEM OPERATION

Referring to FIG. 1, to read out the information representing the meter M1, the interrogate source generates an interrogate signal by amplitude modulating the 451 MHz transmitter carrier with a digital code signal to represent the sync word, the command word and the serial number for transponder T1. The digital information is encoded by varying the duration of 50% duty cycle pulses of a single cycle of 2.77 kHz, or 1.786 kHz representing a logic 0 or a logic 1, respectively. Thus, a binary 1 is represented as a cycle of 560 microseconds duration while a binary 0 is a cycle of 360 microseconds duration.

The receiver 16 detects the incoming amplitude modulated signal, recovering the low frequency digital information and the interface circuit 28 generates short duration pulses which serve as interrupts to the processor 25. The period between the pulses corresponds to the period of the incoming data. Data bits with a period from 260 microseconds to 460 microseconds are interpreted as logic 0 bits while data bits with lengths from 460 to 660 microseconds are interpreted as logic 1 bits. Detections outside of these periods are considered a bad bit.

The processor 25 processes the incoming digital information under software control, providing bit and word verification operations, reformulates the sync word, command word and serial number word of the interrogate signal, and generates control commands for enabling the transmitter 17 to transmit data when receipt of a valid address is verified.

Referring to FIGS. 3–5, the transponder processor 25 begins executing the program stored in the ROM each time it is activated (block 161) by the timing and control 26. The first operation is to disable interrupts. Since the external interrupt line of the processor is used for resolving incoming data from the receiver, the interrupt signal from the receiver is disabled until the processor has set up the interrupt routine and is ready to receive. Next, the software performs several initialization steps, setting up pointers and flags to default values.

A second part of initialization is to check the outputs of the optical encoder 27 to determine the position of the interrupter disc. The processor activates the light source *27a* and reads the state of the detector *27b* on lines *27c* and *27d*. If both lines are low, a flag called MFLAG is reset. If they are both active and MFLAG is in a reset state, the reading is incremented, and MFLAG is set. The intermediate conditions of one line active and one inactive is ignored. MFLAG is used as a toggle to indicate the partial revolution of the interrupter disk.

In the meter reading portion of the program, a counter called LOOPCOUNT is set to 200 following the encoder reading and meter update. During the data receiving loop portions of the program, this counter is decremented each time a bad bit or an invalid condition (e.g., illegal command, unmatched serial number, etc.) is detected. If the LOOPCOUNT counter reaches zero, the software returns to the beginning of the program. This insures that the transponder can continue to update the meter reading even though it may be under continuous interrogation. Under the absolute worst case conditions the meter encoder will be read every 40 seconds. A more typical value under normal interrogation conditions to 5 seconds.

After the reading is checked, the program enters the data receiving loop routine, blocks 163–169, the central portion of the transponder software, where the incoming data is resolved (via the interrupt and verification routines). The data receiving loop software also determines if the transponder circuits should stay active, or return to the low power mode. After initialization, the interrupts are enabled, block 172 (FIG. 4) and the processor enters the idle mode block 173 awaiting an interrupt, corresponding to the first detected bit of the interrogate code transmitted by the interrogate source 13.

The interrupts provided at the output of interface circuit 28 (FIG. 1) are fed to the interrupt input of the processor. The interrupt routine (FIG. 4) measures the period between interrupts, and thereby measures the receiver data bit lengths. It utilizes the processor internal timer circuit to do this. The internal timer is configured to count the 2 MHz processor clock when activated.

Referring to FIG. 4, when an interrupt is detected, the interrupt routine 171 is entered and at block 174 further interrupts are disabled. The count registered by the timer counter is stored and the counter is restarted. Then the verification operations are carried out. The timer counter count value is checked for an overflow, i.e. indicative of a time period greater than 660 microseconds. An overflow indicates the previous bit time was too long to be a good bit (longer than 660 microseconds). On a counter overflow, the bad bit routine 180 (FIG. 5) is entered. If a counter overflow has not occured, the interrupt routine sets a new interrupt pointer to the bad bit routine, and interrupts are then enabled and the internal timer is reset and restarted at block 176. Now if an interrupt occurs, it indicates a period too short (less than 260 microseconds) to be a good bit, and the bad bit routine is again entered.

The interrupt routine at block 177 then calculates the value of the previous bit based on the timer count (block 175) which has been stored, and at block 178 returns to the main program at blocks 164–166 (FIG. 3). The main program stores the value of the bit returned by the interrupt routine, and changes data pointers and counters if necessary. Finally, the main program changes the interrupt pointer back to the standard interrupt routine at the time corresponding to the start of a valid "0" bit, approximately 260 microseconds after the previous interrupt. The main program then reenters an idle state (blocks 172–173), waiting for the next interrupt. An external interrupt from a good bit must occur or else the timer counter will overflow and generate an internal interrupt. In either case, the interrupt routine is entered again, and the process repeats to receive the remaining bits of the sync word, the four bit command word and the 28 bit serial number.

Since the interrupt routine expects the timer to be running when an interrupt occurs, it is necessary to catch the first bit and start the timer at the beginning of receiving a bit stream. When the data receiving loop is first entered, several pointers, counters, and flags are initialized. Then a short routine is entered that looks for the next interrupt pulse, although the interrupt routine is not enabled yet. When it occurs, the interrupt routine timer count is started, and external interrupts are enabled. Now the program can jump to the interrupt routine on each received bit pulse, and return to the main program with the bit value. Each time the interrupt routine is entered and a bit is determined to be good, the processor issues a reset pulse to the circuit timer and decrements the badword counter one count. This counter is set to an initial count of 128 at the start of an interrogate cycle. If an interrupt does not occur or if only bad bits are received, the timer eventually resets the processor and returns the unit to a low power mode, block 170.

When a bit is too long or too short to be good, the verification routine (FIG. 5) is entered. This routine resets the interrupt pointer, and at blocks 190–192 keeps track of bad bits and checks to see if five bad bits have been received since the last valid sync word. If five bad bits have been received, at block 193 the processor enables the timing and control 26 to place the system in the low power mode. If less than five bad bits have been received, control is passed back to the beginning of the data receiving loop routine.

Regarding the manner in which the sync word, the command word and the serial number word are formulated, once the first bit edge is caught, the data receiving routine keeps shifting the subsequent bits returned by the interrupt routine through a buffer. The buffer is checked each time for the presence of a series of eight valid bits having the coding that corresponds to the sync word coding stored in RAM. If 128 good bits are received before a valid sync word has been received (block 187), the program (blocks 194–196) jumps to an instruction which causes the unit to return to the low power mode.

Referring to FIG. 3, if a valid sync word is detected, the program assumes that it has found the beginning of an interrogation transmission. Data pointers are changed, and the next four bits received are stored in a COMMAND register (block 165). Again pointers are changed, and the following 28 bits are stored in the memory (block 166). If while receiving the command or serial number bits, a bad bit is detected, the program returns to the beginning of the data receiving loop. Pointers and registers are re-initialized, and the receiving process starts again.

Once reception of a serial nubmer is complete, the loop routine continues by checking the received serial number (block 167). If all seven received serial number digits can be matched, then the requirements for a response will have been met, and the software jumps to the transmit portion of the software.

The transmission routine generates modulating frequencies by using the internal timer to divide down the 2.0 MHz clock signal appearing at the EF1 pin of the processor 25 to 45.45 kHz and 50.00 kHz. The transmitter 17 is activated by setting latch circuit 91. The processor Q output line is then toggled at these frequencies to provide transmitter modulation via data drive circuit 93 (FIG. 2). To transmit a bit, the software needs to obtain the bit to be transmitted, load the proper divisor into the internal timer, direct the output to the processor Q line, and wait for one bit time (360 microseconds). This process is repeated for each transmitted bit.

When the routine is first entered, the transmitter 17 is turned on and a constant 45.45 kHz modulating frequency is generated. The software then waits for a short time, causing slightly more than two complete "1" bits to be transmitted previous to the data transmission. This delay allows the transmitter circuit to stabilize.

The routine then reads the COMMAND register and checks to see if a reading or serial number was requested. Consequently, the routine then sets data pointers to either the permanent serial number memory or the permanent reading memory. In either case, 28 bits are examined sequentially and the corresponding modulating frequencies are generated for 360 microseconds for each bit. Following the transmission of the 28 bits, the processor 25 turns the transmitter 17 off.

SECOND EMBODIMENT

In the foregoing embodiment, a processor operating under program control verifies the validity of the incoming interrogate signal by checking the incoming signal on a bit-by-bit basis and checks the received sync word and the received identification word portions of the signal with stored words. It is apparent that these operations can also be done by discrete circuits. For example, referring to FIG. 6, there is shown a block diagram of a second embodiment of a signal processor circuit 200 provided in accordance with the invention which employs discrete circuits for providing the interrogate signal verification operation described above. The processor circuit 200 includes an interface circuit 201, an edge detecting circuit 202 and a verification circuit 203. Operation of the processor circuit 200 is synchronized by a timing circuit 204 which provides square wave signals at a 100 kHz rate.

The edge detecting circuit 202 includes a four-bit shift register 211, a decoder circuit 212 and a reset circuit 213 including a NAND gate 214 and an inverter 215.

The verification circuit 203 includes a counter circuit 221, a decoder circuit 222, a reset circuit 223, and an output register section 224 including a sync word shift register 225, an identification code word register 226 and an error register 227. The verification circuit 203 also includes a strobe signal generator 228, a data compare circuit 229 and a control circuit 230.

The interface circuit 201 includes a high gain linear amplifier 201*a* having its input connected to the output of detector 22 (FIG. 1). The amplifier 201 amplifies the AC output of the detector 22 which is the 2.77 kHz or 1.786 kHz digital code signal. The output of amplifier 201*a* is applied to a slicing circuit 201*b* which limits this signal, providing a square wave signal which is 560 microseconds in duration for each logic 1 bit and 360 microseconds for each logic 0 bit of the interrogate code. The output of the slicing circuit is connected to the data input of the four-bit shift register 211. The shift register 211 is clocked by the leading edges of 100 kHz square wave timing signals provided by timing circuit 204. The decoder circuit 212 responds to outputs of the shift register 211 to provide a positive going signal output from gate 214 whenever the data input of the shift register is maintained low for three successive clock signals after being in a high state, indicative of detection of the negative going edge of a data bit in the incoming interrogation signal stream. The three cycle delay provides a degree of immunity from noise for the processor circuit 200.

Counter circuit 221 is connected for operation as an interval timer and responds to the timing signals provided by timing circuit 204, to time the duration of each bit of the incoming signal and indicatve whether the detected bit is a logic 1, a logic 0 or an error bit. The counter 221 is held reset by reset circuit 223 in the absence of an incoming signal, but is enabled by the positive pulse from gate 214 to count the timing signals when the negative edge an incoming signal is detected until the detection of the next negative going edge of the succeeding data bit. The decoder circuit 222 decodes the outputs of the counter and provides an output on data line 222*a* indicating that the input signal is a logic 1 when the elapsed time is in the order of 560 microseconds, or a logic 0 when the elapsed time is in the order of 360 microseconds, or on an error line 222*b* when the count stored by counter 221 represents a time period outside of the range representing logic 1 or logic0. Register 227 responds to the error signal and generates an error reset signal for resetting data shift registers 225 and 226.

The sync word shift register 225 receives and decodes the first eight bits which correspond to the sync word portion of the incoming interrogate signal. Shift register 226 receives and stores the twenty-eight bit identification word portion of the interrogate signal as it is received. Each shift register 225 and 226 has a clock input connected to the output of the decode circuit 212 to receive a shift pulse generated with the detection of each falling edge of the incoming data signal. Shift registers 225 and 226 have a reset input connected to the output of the error register 227 to enable reset of the registers 225 and 226 upon detection of an error bit. The shift registers 225 and 226 have associated decoder circuits 225' and 226' which provide respective outputs indicating receipt of a valid sync word and the identification code assigned to the transponder when such data is received in the corresponding register.

The data compare circuit 229 has its input connected to the outputs of decoder circuit 222 enabling valid bit signals to be gated by strobe signals generated by strobe signal generating circuit 228 to the control circuit 230. Control circuit 230 sequences the operation of the processor circuit 220, including routing of incoming data bits first to the sync register 225 until a valid sync word is detected, and then to the identification code word register 226.

OPERATION

Figure 6:
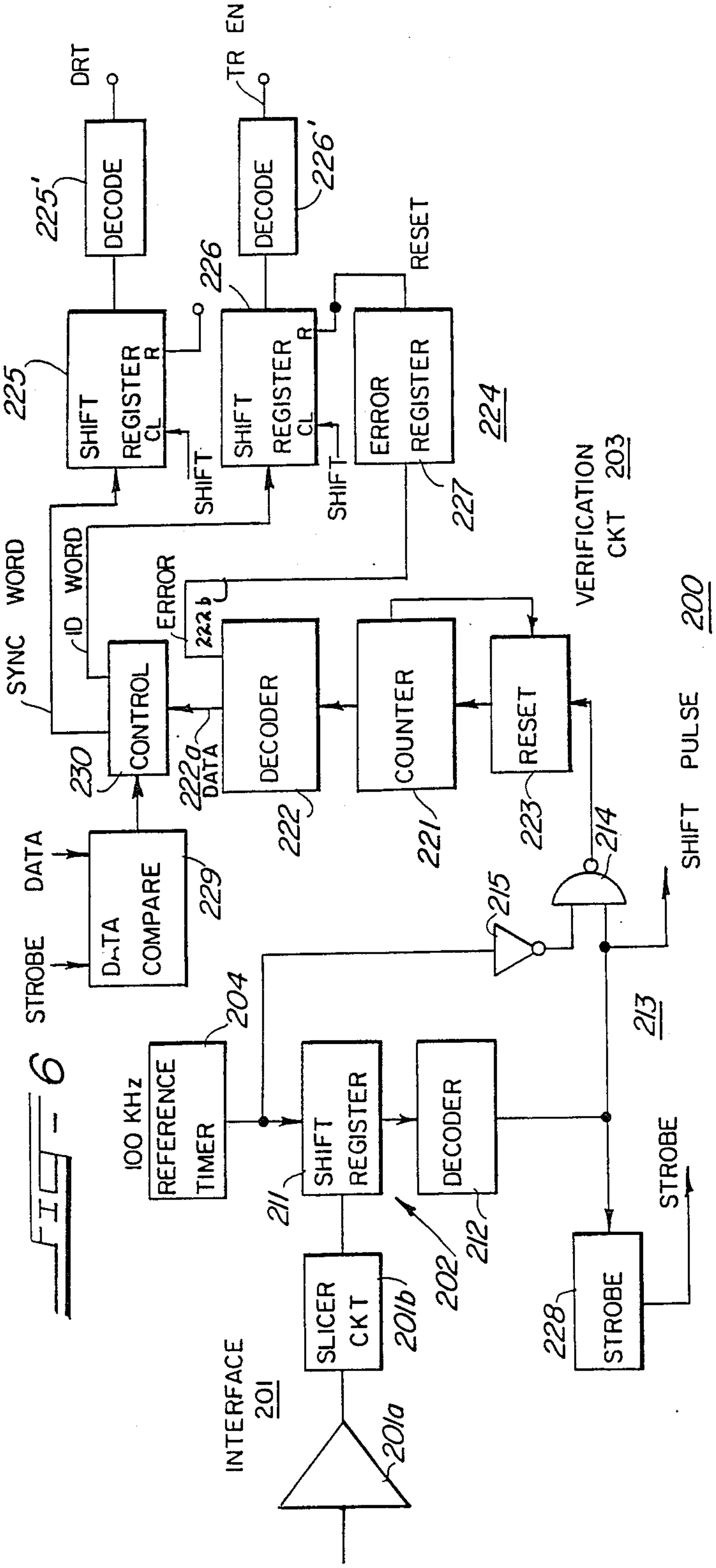
FIG. 6 is a block diagram of a signal processor circuit of a second embodiment for a transponder for the data transmission system.
Figure 7:
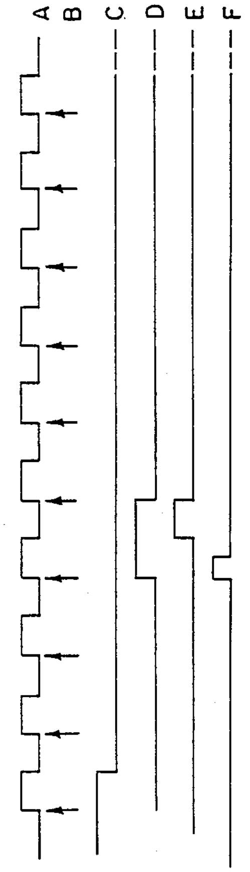
FIG. 7 is a timing diagram for the signal processor circuit shown in FIG. 6.

Referring to FIG. 6 and to FIG. 7, which is a timing diagram for the processor circuit 200 shown in FIG. 6, the timing circuit 204 provides timing signals at a 100 kHz rate for synchronizing the operation of the processor circuit 200. The edge detecting circuit 202 enables the counter 221 to count the timing signals for the duration of each bit of the incoming interrogate signal, that is, until the counter is reset by the reset circuit 213.

The timing signals, FIG. 7, line A, generated by the timing circuit 204 are also supplied to the clock input of the shift register 211. In response to trailing edge of each signal of the incoming bit stream, the shift register 211 responds to the leading edges of the timing signal, FIG. 7, line B, to shift the signal level (FIG. 7, line C) appearing at its data input through the four stage shift register. The outputs are decoded by circuit 212 so that after three timing signals, FIG. 7, line B, following the falling edge of the signal at the shift register data input (line C) the output of the decoder circuit 212 goes high, FIG. 7, line D. This signal is applied as a counter reset signal through gate 214, when strobed by a clock signal (See FIG. 7, line E) through inverter 215, to enable reset circuit 223 to reset the counter circuit 221.

The counter circuit 221 then counts the timing signals at the 100 kHz rate provided by timing circuit 204 until it is reset by the next counter reset signal generated by shift register 211, decoder circuit 212 and gate 214. At such time, the count of the counter circuit 221 corresponds to the period of the incoming data bit, a logic 0 being represented by a count of 24 to 47 corresponding to a period of 240–470 microseconds between negative transitions and a logic 1 being represented by a count of 48 to 63 corresponding to a period of 480–630 microseconds between negative transitions. As each negative transition occurs, the counter condition is observed to determine the binary value of the previous data bit received (See FIG. 7, line F) before resetting the counter for a new data bit time measurement. If the data period is from 240 microseconds to 470 microseconds, decoder circuit 222 provides a logic 0 level on data line 222*a*. If the data period is from 480 microseconds to 630 microseconds, decoder circuit 222 provides a logic 1 level on data line 222*a*. When the data period is less than 240 microseconds or longer than 630 microseconds, the decoder circuit 222 provides an output on error line 222*b* which causes error register circuit 227 to reset the shift registers 225 and 226.

With reference to FIG. 7, line D, the output of decoder 212 is generated with the leading edge of timing signals whereas the counter reset, signal E, is generated in response to enabling of gate 214 which is effected by the trailing edge of the timing signals. During this delay time, the output of the counter decoder circuit 212 is applied to the sync word shift register 225, being clocked into the shift register 225 by the rising edge of the decodersignal, FIG. 7, line D. In addition, the output of the decoder circuit 222 is applied to data compare circuit 229 which is strobed by a strobe signal FIG. 7, line F generated by strobe signal generating circuit 228, which generates a positive going pulse in response to the detection of each bit. This signal is applied to the control circuit 230 which controls steering of the bits between the sync word shift register 225 and the identification code word register 226.

After a valid eight bit sync word has been detected, as indicated by an input to the data compare circuit 229 provided by the decoder circuit 225′ associated with the sync word register 225, the control circuit 230 causes the next four bits, which are the operation command, to be stored in a suitable register (not shown) and then directs the remaining twenty-eight bits of the interrogate signal to the input of the identification code shift register 226.

After a twenty-eight bit identification word has been received in the identification code shift register 226, the decoder 226′, associated with the identification code shift register 226, generates a signal TRANSMIT ENABLE if, and only if, the identification code received in shift register 226 corresponds to that assigned to the transponder.

In the event a bad bit is received, an indication is provided over error line 222*b* at the output of decoder 222 which is stored in error register 227. This causes the register 227 to generate an error reset signal which resets the shift registers 225 and 226 to terminate the current interrogate cycle. In addition, in the event of an overflow for counter 221, reset circuit 223 is enabled to reset the counter, also resulting in an error indication.

The signal TRANSMIT ENABLE generated by shift register 226 as the result of the verification of the incoming interrogation signal is used to cause the transmitter to be activated and to initiate the readout of the information provided by the transponder registers. Arrangements for effecting these operations are known in the art and have been described in detail in U.S. Pat. No. 4,040,406, 3,967,202 and 3,705,385, for example.

While particular embodiments of the present invention have been shown and described, it is apparent that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

APPENDIX I

```
..
.........................................................CONSTANT EQUATES
..
TAMPMASK EQU  80H              ..
MXBADWRD EQU 128D              ..Maximum # of bits allowed (w/o sync.)
MXBADBIT EQU   5D              ..Maximum # of bad bits allowed (w/o sync.)
SYNCWORD EQU  81H              ..Syncword.
PROGCMMD EQU  0FH              ..Reprogram command.
NOFS     EQU 255D              ..Number of 'sleep' states until F's allowed.
MOD0VAL  EQU  20D              ..20 for 50kHz  ;10 for 100kHz
MOD1VAL  EQU  22D              ..22 for 45kHz  ;11 for  91kHz
LOOPCTVL EQU 200D              ..Meter reading update counter.
VERSION  EQU  01D              ..Version number.
..
         ORG PROGRAM
..
..----------------------------------------
..!              INITIALIZE              !
..----------------------------------------
..
         DIS      ;DC 30H                     ..Disable interrupts.
..                                            ..Let P=0, X=3 (X1)
         LDI      00
         PHI      CF
..
..
INIT     B2       C1                          ..Test for EF2 TX-TEST mode.
         LBR      TXTEST
..
C1       RLDI     X1, BUFFER+20H              ..Set up X1 pointer A.1
         LDI      VERSION                     ..  and set version number.
         STR      X1
..
CKFNUM   GHI      FNUM                        ..Check FNUM for accept/reject
         SMI      01                          ..  wildcards.
         PHI      FNUM
         BNZ      TAMPER
         PLO      FSTATE
```

```
..
..
..
..                        ADDRESS EQUATES          PROGRAM  EQU  0000H   ROM start address
..                                                 BUFFER   EQU  0800H   RAM start address
..                                                 MRBUFF   EQU  0818H   Meter reading
..                                                 INBUFF1  EQU  0814H   Primary input buffer
..                                                 INBUFF2  EQU  080AH   Secondary input buffer
..                                                 PERMSN   EQU  081FH   Permanent serial number
..-------------------------------------------
..!           UPDATE METER READING          !
..-------------------------------------------
METER    LDI      A.O(BUFFER)
         PLO      X1
..
         SEQ                                      ..Turn L.E.D. on and wait...
         SEQ
         NOP
         NOP
         INP      2                               ..Read phototransistor status
         REQ                                      .. and turn L.E.D. off.
..
         LDX                                      ..Get the phototransistor
         ANI      00000101B                       ..  status, and check to see
         XRI      00000101B                       ..  if they are both on or
         BZ       ONES                            ..  both off. If neither, exit
         XRI      00000101B                       ..  else check previous
         BZ       ZEROS                           ..  condition and increment
         BR       CHKCF                           ..  meter reading if required.
..
ZEROS    GLO      MFLAG                           ..(Both zero.)
         BZ       CHKCF
         LDI      00
         PLO      MFLAG
         BR       CHKCF
..
ONES     GLO      MFLAG                           ..(Both one.)
         BNZ      CHKCF
         LDI      01
         PLO      MFLAG
..
```

```
INCMTR  LDI     A.0(MRBUFF)
        PLO     X1                  ..Increment the meter reading.
        LDX                         ..The meter reading is stored
        ADI     01                  ..  in three bytes, so carry
        STXD                        ..  when appropriate.
        BNF     CHKSUM
        LDX
        ADI     01
        STXD
        BNF     CHKSUM
        LDX
        ADI     00000001B           ..Don't disturb other bits
        ANI     00000011B           ..  if carry into the last
        PLO     X2                  ..  byte. (The last byte
        LDX                         ..  contains only two bits of
        ANI     11111100B           ..  meter reading data.)
        STR     X1
        GLO     X2
        OR                          ..(X2 is used as a temporary
        STR     X1                  ..  register here.)
        BR      CHKSUM
..
CHKCF   GHI     CF                  ..
        BZ      ENDM                ..
..                                  ..

        LBR     RXINIT
..
..
..-----------------------------------------
..!         INTERRUPT SUBROUTINES        !
..-----------------------------------------
..
..    The interrupt routines determine the period since the previous
..  interrupt and calculate the value of the received bit:
..              260us to 460us = 0
..              460us to 660us = 1
..  Values outside these limits cause a return to BADBT, otherwise the
..  routines return normally.
```

```
..
..                                            ..NORMAL INTERRUPT:
INT      RNX      R1                          ..Change program counter to
         SEP      R2                          ..  allow furthur interrupts.
         STPC                                 ..Stop counter.
         RLDI     R1, IBAD                    ..Set new interrupt pointer.
         BCI      BADLONG                     ..Check for long bad bit.
         RET     ;DC 22H                      ..Enable interrupts.
         GEC                                  ..Get count and calculate bit
         SMI      50D                         ..  value (0 or 1).
         SMI      100D
         LDI      140D                        ..Bit value in  DF.
         LDC
         SPM2                                 ..Reset and start counter.
         INP      4                           ..Bump timer on good bit.
         RET     ;DC 30H                      ..Return, interrupts enabled.
..
..                                            ..SHORT/BAD BIT INTERRUPT:
IBAD     RNX      R1                          ..Change program counter to
         SEP      R2                          ..  allow furthur interrupts.
BADLONG  STPC                                 ..Stop counter.
         RLDI     R0, BADBT                   ..Set up new interrupt pointer
         RLDI     R1, IBAD                    ..  and return to BADBT, but
         DIS     ;DC 30H                      ..  don't enable interrupts
..                                            ..  yet.
..
         ORG 0100H
..
..
..!------------------------------------------------!
..!            MAIN PROGRAM LOOP                   !
..!------------------------------------------------!
..
..      This loop incorporates the routines to receive interrogations,
..  transmit a response, and reprogram the serial # and meter readings.
..  This loop can only exit on the following conditions:
..
..        -Bad condition timeout.(i.e., bad bits or no syncword.)
..        -Meter reading update counter at zero.
```

```
..        -Test mode flag set.
..
..-------------------------------------
..!              RECEIVE               !
..-------------------------------------
..
...................................................PRIMARY INITIALIZATION
..
RXINIT  LDI     00
        PLO     REPRFG                                   ..Reset          flag
        PHI     TNIB                                     ..Clear some counters.
        PHI     TBIT
        LDI     01
        PHI     FFLAG                                    ..FFLAG<=NO F's received.
..
...................................................RE-INITILIZATION FOR REPROG.
..
RECEIVE LDI     MXBADWRD                                 ..Load bad bit counters.
        PLO     BADWORD
        LDI     MXBADBIT
        PLO     BDSYNBIT
        LDI     07
        PLO     TNIB                                     ..Set TNIB & TBIT to save time
        LDI     04
        PLO     TBIT                                     ..  in FOUND routine.
..
        LDI     A.1(BUFFER)
        PHI     X2
        GLO     REPRFG                                   ..Set input buffer pointer
        SMI     01                                       .. according to REPRFG value.
        BNZ     NORMLD
        LDI     A.0(INBUFF2+1)  ;PLO X1
        BR      NEWSYNC
NORMLD  LDI     A.0(INBUFF1+1)  ;PLO X1
..
NEWSYNC LDI     00                                       ..Clear sync-word buffer.
        PLO     SYNCREG
..
...................................................CATCH 1ST BIT
```

```
..
PRESTRT BXI     P2                         ..Wait for first edge.
        BR      PRESTRT
..
P2      STPC                               ..Start counter on edge.
        LDI     156
        LDC
        SPM2
        RLDI    R1, IBAD
        SEX     R0
        RET     ;DC 30H                    ..Enable interrupts.
        LDI     9
PLOOP   SMI     1
        BNZ     PLOOP                      ..Wait for next edge.
..
.............................................GET SYNCWORD
..
CALLRDB RLDI    R1, INT
        IDL                                ..Get a bit.
..
RDBTRTN GLO     SYNCREG                    ..Shift incomming bits through
        SHLC                               ..  SYNCREG and compare it
        PLO     SYNCREG                    ..  with the sync-word.
        XRI     SYNCWORD
        BZ      FOUND                      ..Leave if found.
        NOP
..
.............................................BAD SYNC WORD
..
SYNWDBD DEC     BADWORD                    ..Count bits received with no
        GLO     BADWORD                    ..  sync-word recognition.
        BNZ     CALLRDB                    ..  Stop if too many, else go
        BR      STOP                       ..  get more.
..
.............................................BAD BIT
..
BADBT   STPC                               ..Bad bits count as bits with
        DEC     BADWORD                    ..  no sync-word too.  Again,
        GLO     BADWORD                    ..  stop if too many.
```

```
        BZ      STOP
        GLO     BDSYNBIT                 ..Count total bad bits
        BZ      BAD                      ..  received with no syncword
        DEC     BDSYNBIT                 ..  and stop if too many, else
        GLO     BDSYNBIT                 ..  exit (through BAD after a
        BNZ     BADSBIT                  ..  syncword; BADSBIT before.)
..
.................................................STOP
..
STOP    SEX     RO                       ..Disable interrupts...
        DIS     ;DC 30H
        OUT     6                        ..  and turn off timer to
        IDL                              ..  stop.
..
.................................................BAD SYNC BIT [Bad bit before
                                         ..  sync-word]
..
BADSBIT DEC     LOOPCOUNT                ..Exit to INIT if meter needs
        GLO     LOOPCOUNT                ..  updating, else return to
        LBZ     INIT                         [illegible]
        BR      NEWSYNC
..
.................................................BAD CONDITION [Bad bit or
..                                       ..  condition after sync-word]
BAD     DEC     LOOPCOUNT                ..Exit to INIT if meter needs
        GLO     LOOPCOUNT                ..  updating, else return to
        LBZ     INIT                     ..  RECEIVER beginning.
        BR      RXINIT
..
.................................................GET COMMAND
..
FOUND   LDI     00                       ..A '0' in BDSYNBIT indicates
        PLO     BDSYNBIT                 ..  sync-word was received.
        NOP                              ..Loop 4 times to get 4
GETCMD  NOP                              ..  command bits:
        RLDI    R1, INT
        IDL                              ..Get a bit.
..
        GHI     COMMAND                  ..Store bits in COMMAND.
        SHLC
```

```
        PHI      COMMAND
        DEC      TBIT
        GLO      TBIT
        BNZ      FOUND                              ..Loop until all bits received
        NOP
..
..................................................GET SERIAL NUMBER
..
NEXTNIB LDI      04                                 ..Loop 28 times to get seven
        PLO      TBIT                               ..  4 bit serial number digits
        DEC      X1
NEXTBIT RLDI     R1, INT
        IDL                                         ..Get a bit.
..
        LDN      X1
        SHLC
        STR      X1                                 ..Store bits in INBUFF1 or 2
        DEC      TBIT                               ..  (depends in REPRFG value)
        GLO      TBIT
        BNZ      NBPAUSE
        DEC      TNIB
        GLO      TNIB                               ..Loop until all bits received
        BNZ      NEXTNIB
..
..................................................CHECK COMMAND - NORM/REPROG?
..
CHKCMMD GHI      COMMAND                            ..Normal interrogation done -
        ANI      OFH                                ..  Check for
        XRI      PROGCMMD                           ..  command.
        LBNZ     CHECKT                             ..Branch to check serial # or.
        LBR      REPROG                                branch to
..
..                                                  ..Timing delay.
NBPAUSE NOP
        NOP
        LBR      NEXTBIT
..
..
..
```

```
..
..-----------------------------------
..!     NORMAL INTERROGATION        !
..-----------------------------------
..
..
CHECKT  SEX     R0                              ..Disable interrupts when done
        DIS     ;DC 30H                         ..  with interrogation.
        B4      CHKSDLY                         ..Check for test mode (EF3=0),
        BN3     TESTJMP                         ..  branch to TEST routines
NORM    BR      CHKSN                           ..  if requested.
..
TESTJMP LBR  .. TEST                            ..Preserve timing.
..
CHKSDLY BR      NORM
..
.............................................CHECK SERIAL NUMBER
..
CHKSN   LDI     A.0(INBUFF1) ;PLO X1            ..X1 points to received #
        LDI     A.0(PERMSN)  ;PLO X2            ..X2 points to permanent #
        SEX     X1
..
        LDI     07                              ..Loop 7 times, comparing each
        PLO     TNIB                            ..  digit.
NEXTSN  LDI     0FH
        AND                                     ..Clear old stuff.
        STR     X1
        OUT     4
        DEC     X1
        XRI     0FH
        BZ      WILDSN                          ..Check for wildcard.
        LDN     X2
        XOR                                     ..Compare the digits.
        BZ      GOODSN
        LBR     BAD
WILDSN  PHI     FFLAG                           ..Set FFLAG=0 on wildcard.
        PHI     FFLAG
        PHI     FFLAG
GOODSN  DEC     TNIB                            ..Bump counters.
```

```
         GLO      TNIB
         BZ       CHECKF
         DEC      X1                              ..Bump pointers.
         DEC      X2
         BR       NEXTSN                          ..Loop until done.
..
.............................................................CHECK COMMAND FOR "F" STATUS
..
CHECKF   GHI      COMMAND                         ..Check command for...
         SHR
         SHR
         BDF      FOFF                            ..  reject wildcards request,
         SHR
         BDF      FON                             ..  accept wildcards request.
XXX      NOP
         NOP
         BR       CHFFLAG
FOFF     GHI      FFLAG                           ..Set reject wildcards.
         BZ       XXX                             ..(But not if F's exist)
         LDI      NOFS
         PHI      FNUM
         PLO      FSTATE
         BR       CHFFLAG
FON      LDI      00                              ..Set accept wildcards.
         PHI      FNUM
         PLO      FSTATE
         BR       CHFFLAG
..
ZZ       SEX      X1                              ..(CHFFLAG timing.)
         LBR      SEND                            ..Transmit if no problems.
CHFFLAG  GHI      FFLAG                           ..If FFLAG=0 (Received F's),
         BNZ      ZZ
         GLO      FSTATE                          ..  and FSTATE=1 (IGNORE F's),
         LBNZ     BAD                             ..  a bad condition exists.
..
..--------------------------------
..!        TRANSMIT RESPONSE     !
..--------------------------------
..
```

```
..      Transmits MRBUFF when low COMMAND bit =1, SNBUFF when =0.
..
SEND     SEX     X                         ..(Make X harmless.)
         OUT     5                         ..Turn on transmitter and
         LDI     MOD1VAL                   ..  Start sending 1's.
         LDC
         ETQ
         SCM1
         LDI     (9+18)                    ..(18= 1 bit-time)
PRETXDL  SMI     01                        ..Delay to synchronize reply.
         LBNZ    PRETXDL
..
         GHI     COMMAND                   ..Determine request: serial
         SHR                               ..  number or meter reading.
         BNF     SENDSN
SENDMR   LDI     A.0(MRBUFF)               ..SEND METER READING
         PLO     X1                        ..Load address pointers,
         LDI     04                        ..  counters,
         PLO     TNIB                      ..  and direction pointer
         LDI     08                        ..  for meter reading.
         PHI     TEMPBIT
         BR      NXTNIB
SENDSN   LDI     A.0(PERMSN-6)             ..SEND SERIAL NUMBER
         PLO     X1                        ..Load address pointers,
         LDI     08                        ..  counters,
         PLO     TNIB                      ..  and direction pointer
         LDI     04                        ..  for serial number.
         PHI     TEMPBIT
         BR      NXTNIB
..
NXTNIB   GHI     TEMPBIT                   ..Get next nibble/byte.
         XRI     04
         BZ      SNINC                     ..Bump pointer in correct
MRDEC    LDN     X1                        ..  direction and load next
         DEC     X1                        ..  nibble/byte.
         BR      GOTNXNB
SNINC    LDN     X1
         INC     X1
         BR      GOTNXNB
```

```
GOTNXNB PLO     OUTBIT
        GHI     TEMPBIT
        PLO     TBIT
..
NXTBIT  GLO     OUTBIT
        SHR                         ..Get next bit.
        PLO     OUTBIT
        BDF     MOD1
MOD0    LDI     MOD0VAL             ..Get Xmit frequency.
        BR      MOD
MOD1    LDI     MOD1VAL
        BR      MOD
..
MOD     LDC                         ..Get Xmit frequency.
        ETQ                         ..  from bit value.
        SCM1
        LBR     DELAY
..
DELAY   OUT     4
        LDI     08H                 ..Delay to make a bit-time.
DELAYL  SMI     01
        BNZ     DELAYL
        DEC     TBIT
        GLO     TBIT                ..Need a new bit?
        BNZ     BITDEL
        DEC     TNIB
        GLO     TNIB                ..Need a new byte/nibble?
        BNZ     NXTNIB
..
        LDI     09                  ..Delay to allow last bit to
LASTBDL SMI     01                  ..  finish
        BNZ     LASTBDL
        STPC
        LDC                         ..Since we're done,
        REQ                         ..  STOP Q,
        OUT     2                   ..  TRANSMITTER OFF,
        BR      TMPRSET             ..  and exit.
```

```
BITDEL   LDI     05                    ..A little more delay if you
DELLOOP  SMI     01                    ..  don't need a new nibble
         BNZ     DELLOOP               ..  or byte.
         BR      NXTBIT
..
TMPRSET  GHI     COMMAND               ..Check              command,
         ANI     00001000B             ..  skip if none.
         BZ      ENDSEND
         RLDI    X, (MRBUFF-2)         ..Load address of          bit
         LDI     00000100B             ..Check if         is already
         AND                           ..  reset, reset if needed.
         BZ      ENDSEND
         LDI     11111011B
         AND
         STR     X
         LDI     01
         PHI     CF                    ..Set            request flag
..                                     ..
ENDSEND  LDI     208D
ETD      OUT     4                     ..Delay for receiver recovery.
         SMI     01
         BNZ     ETD
         SEX     X1
         LBR     INIT                  ..Done - return to INIT.
END
```

REGISTER EQUATES

```
MAIN       EQU  R0    Main program counter,
INTERRUPT  EQU  R1    Interrupt program counter,
X          EQU  R2    Main data pointer/second interrupt PC
X1         EQU  R3    Primary data pointer
X2         EQU  R4    Secondary data pointer
MFLAG      EQU  R5 0  Meter reading update flag
COUNT      EQU  R4 1  Interrupt routine count storage
FSTATE     EQU  R6 0  0=Accept F's; 1=Reject F's
FNUM       EQU  R6 1  Reject F's cycle counter
BDSYNBIT   EQU  R7    Bad bit counter
TBIT       EQU  R8    General purpose bit counter
TXTFLAG    EQU  R8    Used in TXTEST mode
TNIB       EQU  R9    General purpose nibble counter
SYNCREG    EQU  RA 0  Syncword register
COMMAND    EQU  RA 1  Command register
OUTBIT     EQU  RB 0  Used in TX
TEMPBIT    EQU  RB 1  Used in TX; TBIT temp. store
REPRFG     EQU  RC 0  Reprogram status flag
FFLAG      EQU  RC 1  F's in terrogate flag(0=F's)
LOOPCOUNT  EQU  RD 0  Meter update counter register
CF         EQU  RD 1  Checksum request flag
           EQU  RE
BADWORD    EQU  RF 0  No syncword bit counter
```

We claim:

1. In a system for selectively obtaining data from a plurality of remotely located data indicating devices, including an interrogate source and a plurality of transponders each including information processing circuit means including signal receiver means, signal transmitter means and signal processor means, each transponder being associated with a different one of the data indicating devices, the improvement comprising: means at said interrogate source for transmitting an interrogate signal for effecting the readout of a selected indicating device, said interrogate signal including single cycles of binary signals of first and second time durations respectively in a coded sequence of signals comprising a multibit sync word and a multibit address word for addressing a selected transponder, and each of said transponders further comprising control circuit means including cycle timing circuit means, delay circuit means, and delay override circuit means, said cycle timing circuit means generating a periodically recurring inhibit signal of a predetermined time duration defining a low-power idle mode in which said information processing circuit means is inhibited, said delay circuit means controlling said cycle timing circuit means to delay the generation of each inhibit signal thereby providing a time interval between successive inhibit signals defining a processing mode in which said information processing circuit means is enabled, said information processing circuit means when in said processing mode operating to detect an interrogate signal, and characterized in that the duration of said inhibit signal is considerably longer than said processing mode duration in the absence of an interrogate signal, said signal receiver means including signal edge detecting circuit means enabled by said control circuit means to operate in said processing mode to provide an output signal for each cycle of the binary signals which comprise the interrogate signal, each output signal corresponding to the leading edge of a different one of the binary signals and the elapsed time between successive output signals being indicative of the time duration and the binary state of the bit of the interrogate signal detected, said signal processor means being enabled by said control circuit means to operate in said processing mode and being programmed to respond to the output signals provided by said signal edge detecting circuit means to control said delay circuit means to extend the duration of said processing mode and being further programmed to verify the validity of each bit of the received interrogate signal by determining the elapsed time between successive ones of the output signals provided by said signal edge detecting circuit means and comparing the value of elapsed time determined for each bit with stored reference signals representative of acceptable tolerances on said respective time durations of said detected bits, to determine whether each incoming bit is a first binary state, a second binary state or an invalid bit, said signal processor means accumulating a count of invalid bits and enabling said delay override circuit means to cause said cycle timing circuit means to generate its inhibit signal whereby said information processing circuit means is transferred immediately from the processing mode to the lowpower idle mode, thereby terminating further processing during detection if a predetermined number of invalid bits is detected before said interrogate signal ends, said signal processor means being further programmed to store detected valid bits and compare the same with stored reference signals representing said sync word of said interrogate signal and to cause said cycle timing circuit means to generate said inhibit signal to return said information processing circuit means to said low power idle mode if said sync word is not detected in a predetermined number of bits, and said signal processor means enabling said signal transmitter means to transmit data signals associated with the associated data indicating device only upon verification that the sync word of the received interrogate signal is received and the associated address word is received.

2. A system according to claim 1, wherein the predetermined number of invalid bits is in the range of one to five.

3. A system according to claim 1, wherein said predetermined number of invalid bits is one.

4. A system according to claim 1, wherein said signal processor means comprises a data processor and wherein said output signals provided by said signal edge detecting circuit means comprises pulses which are applied as interrupts to said data processor.

5. A system according to claim 4, wherein said data processor times the duration between successive interrupts to determine the duration of each bit as it is received.

* * * * *